United States Patent [19]

Borrelli et al.

[11] Patent Number: 4,488,864
[45] Date of Patent: Dec. 18, 1984

[54] INTEGRAL OPTICAL DEVICE AND METHOD OF MAKING IT

[75] Inventors: Nicholas F. Borrelli, Elmira; Thomas H. Elmer, Corning; David L. Morse, Corning; Paul A. Sachenik, Corning, all of N.Y.

[73] Assignee: Corning Glass Works, Corning, N.Y.

[21] Appl. No.: 520,457

[22] Filed: Aug. 4, 1983

[51] Int. Cl.³ .............................................. G03C 1/68
[52] U.S. Cl. ...................................... 430/13; 65/60.8; 430/9; 430/16; 430/272; 430/321; 430/328; 430/417; 430/496
[58] Field of Search ............... 430/272, 321, 328, 417, 430/496, 523, 9, 13, 16; 65/60.8

[56] References Cited

U.S. PATENT DOCUMENTS 3,438,801 4/1969 Schlientz et al. ............... 65/60.8
4,100,330 7/1978 Donley ............................ 65/60.8
4,403,031 9/1983 Borrelli et al. .................. 430/321

Primary Examiner—Jack P. Brammer
Attorney, Agent, or Firm—C. S. Janes, Jr.; M. M. Peterson

[57] ABSTRACT

There is disclosed an improved integral optical device of the type produced by creating optical patterns in porous glass bodies, especially patterns involving gradient refractive index distributions. The optical strength of an element, such as a lens, in such an optical pattern is increased by treatment with a polymerizable, organo functional silicone fluid while the matrix glass is sealed.

19 Claims, 2 Drawing Figures

INTEGRAL OPTICAL DEVICE AND METHOD OF MAKING IT

BACKGROUND OF THE INVENTION

This invention relates to integral optical devices based on optical patterns created in porous glass bodies. In one embodiment of particular interest, the pattern is in the nature of an array of cylinders extending through the glass body. Each cylinder has a prescribed, radial, gradient, refractive index distribution. The distribution varies with radial distance, that is from the axial center line of the cylinder to the outside, in a parabolic manner, whereby lens-like properties are derived. In a specific improved construction, an array of cylindrical lens systems is capable of providing a single one-to-one erect conjugate image, as required for such purposes as photocopying.

Ser. No. 277,089, filed June 25, 1981 by two of us (Borrelli and Morse), now U.S. Pat. No. 4,403,031 discloses a method of producing an optical pattern in a porous glass by impregnating the glass with a photolyzable organometallic material and selectively photolyzing the impregnated glass. Among the optical patterns that may be created are gradient refractive index patterns, such as lenses, and optical density patterns.

The patent application defines a photolyzable organometallic as one which undergoes bond scission on exposure to light to produce a photolyzed metal-organic intermediate. This intermediate is preferably reactive, that is capable of reacting with the pore surfaces via hydroxyl groups to form coordination complexes or stronger bonds.

A porous glass is described as one incorporating a multiplicity of interconnected pores of submicron diameter into which the organometallic can be introduced as a liquid or a gas. Preferably, such glass is produced by phase separation and leaching techniques disclosed in U.S. Pat. Nos. 2,106,744, 2,215,036 and 2,221,709.

In accordance with the prior application disclosure, the organometallic material in unphotolyzed areas of the glass may be removed, as by washing or volatilizing. This avoids subsequent reactions in these areas which could blur or distort the pattern introduced. However, the nature of porous glass is such that it is strongly absorbent of moisture and foreign materials in the ambient atmosphere. This can be detrimental in optical devices. The porous glass may be consolidated to a nonporous state of course, but this is a high temperature step that may itself distort optical properties.

It is also frequently desirable to enhance the optical strength of elements created by the photolyzed organometallic process. This is particularly true in the case of lenses formed in arrays for imaging purposes. In such devices, the variable parameters are lens power, as determined by the index difference or gradient ($n_{max}-n_o$) created, and the lens system (glass) thickness.

The optical performance of a gradient index lens is fully developed in an article by F. Kapron in *Journal of the Optical Society of America*, 60, 1433-36 (1970). Further, an article by J. D. Rees in *Applied Optics*, 21, 1009 (1962) describes a lens array for one-to-one conjugate imaging.

An imaging device, capable of providing a one-to-one conjugate, erect image, might be provided if (1) adequate optical strength could be imparted to the individual lenses by enhancing the refractive index differential created in them, or if (2) a glass thickness greater than the normal 2 mm might be used. To this end, efforts were made to extend the exposure time, thereby enhancing the photolysis effect, and/or the depth of treatment in a porous glass body.

The basic aim then was to enhance the radial gradient index effect, and hence the lens power. It was also desired to extend this effect through the entire thickness of the glass body in as nearly uniform manner as possible. It was found, however, that extended exposure tended to create a severe axial gradient refractive index along the optical axis of the exposure radiation. This in turn caused distorted, non-symmetric imaging. Further, such ill effects increased sharply with exposure time.

It appeared critical then to limit exposure time, even though this failed to provide sufficient radial index change for the desired imaging effect. As a rule of thumb, glass thicknesses over about 2 mm were avoided, since the requisite exposure to achieve a reasonable power on the back surface was too great.

One solution to this problem is disclosed and claimed in companion application Ser. No. 520,458. As there described a plurality of samples or thickness not exceeding 2 mm are prepared. In each sample then, the axial gradient is controlled by controlled exposure. A plurality of samples are then aligned and bound in place to provide the required depth. However, this process does involve additional steps which would preferably be avoided in most instances.

Further, it would be highly desirable to be able to render opaque the matrix material intermediate lens systems. In an imaging device for example, this would minimize "cross-talk" and consequent image blurring. For present purposes, a lens system constitutes a cylindrical zone extending through a porous glass body and terminating on opposite faces of the body in planar surfaces that function as lens-like elements, the lens system having a prescribed, radial, gradient refractive index distribution created by photolysis of an organometallic compound in the pores.

PURPOSES OF THE INVENTION

A basic purpose then is to modify and improve the products and method disclosed in Ser. No. 277,089.

Another purpose is to provide a simple, inexpensive procedure for imparting such improvement.

A further purpose is to provide an improved imaging device having an array of lens systems, each of which exhibits a gradient refractive index distribution.

Another purpose is to produce such a device embodying an optical pattern such as disclosed in Ser. No. 277,089.

A further purpose is to provide an optical imaging device wherein the image transmitting elements are surrounded and isolated by an opaque matrix.

A particular purpose is to treat a porous glass body containing an optical pattern in such manner as to render it resistant to ambient influences.

Another particular purpose is to reduce light transmission in and through the matrix glass surrounding an optical pattern.

A further particular purpose is to improve the optical strength of optical patterns, particularly lens arrays, created in accordance with Ser. No. 277,089.

SUMMARY OF THE INVENTION

The invention is embodied in an integral optical device composed of a porous glass body having an optical pattern formed in one or more selected zones of the body by photolysis of an organometallic compound in the pores of those zones, characterized in that the porous glass contains a polymerizable, organo functional silicone fluid that is substantially polymerized in only the one or more zones forming the optical pattern.

In a particular embodiment the optical pattern has a gradient refractive index. For imaging purposes, the pattern may be an array of cylindrical lens systems extending through the porous glass body, the lens systems having a prescribed gradient refractive index distribution, each cylindrical lens system terminating on opposite faces of the glass body in planar surfaces that function as lens-like elements, and being integrally surrounded by a matrix of porous glass filled with an essentially unpolymerized, organo functional silicone fluid.

The porous glass may be one prepared by phase separation and leaching of a borosilicate glass, and the photolysis product may have reacted with the glass or with hydroxyl units absorbed on the glass.

The method aspect is an improved method of producing an optical pattern in glass wherein, a. a porous glass body is impregnated with a photolyzable organometallic compound, b. the impregnated body is exposed to a source of photolyzing radiation that is patterned to selectively expose certain portions of the body and at least partially, photolytically convert the organometallic compound in those portions to photolyzed intermediates that are stable in the glass, c. that portion of the organometallic compound in the unexposed zones, which is not photolytically converted, is removed to leave a porous glass matrix surrounding the patterned areas, and d. an improvement whereby the optically-patterned, porous glass body is fully impregnated with a polymerizable, organo functional silicone fluid and the fluid in the patterned zones is substantially polymerized, as by baking below 200° C., preferably in water vapor, while maintaining that in the matrix glass essentially unpolymerized.

PRIOR LITERATURE

In addition to materials already noted, the following patent literature has been noted:

U.S. Pat. No. 2,315,328 (Hood et al.) discloses impregnating porous glass with a variety of different materials. Included are plastic and resins which may be introduced as monomers and polymerized in situ.

U.S. Pat. Nos. 3,930,812 and 3,930,821 (Elmer) disclose methods of producing carbon-containing glass resistors wherein porous glass is impregnated with furfuryl alcohol, the alcohol is polymerized to a resin, and the impregnated body is fired in a nonoxidizing atmosphere to convert the resin to carbon.

U.S. Pat. No. 3,462,632 (Russi) discloses an incandescent lamp having a single layer of minute glass beads embedded in an adhesive layer which may be a liquid silicone plastic. The glass beads are on the outer surface of the lamp bulb and create a floating image of the general bulb shape in the bulb.

DESCRIPTION OF THE DRAWING

In the accompanying drawing.

GENERAL DESCRIPTION

Basically, the present invention is an improvement on, or addition to, that disclosed in the Borrelli-Morse application mentioned earlier. To save repetition, the disclosure of that application is incorporated in toto, and furnishes the starting point, or point of departure, for the present disclosure.

In the prior method, optical patterns are produced by photolyzing an organometallic compound in selected areas of a porous glass body. Preferably, the photolysis product is then reacted with or attached to the glass to render the pattern dimensionally stable. To this same end, the unphotolyzed organometallic, that is the material in the unexposed areas, is removed by washing, volatilizing, or other suitable means. For present purposes, this step becomes a prerequisite.

The particular optical pattern desired in the glass can conveniently be obtained by totally impregnating the porous glass with an organometallic compound, and then exposing the impregnated glass through an opaque mask. The desired pattern is stamped out, or otherwise provided in the mask, to permit transmission of photolyzing light.

Figure 1:
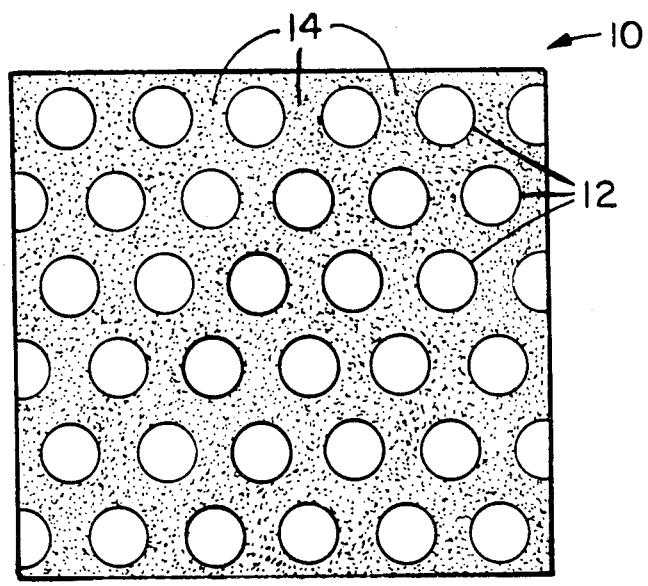
FIG. 1 is a magnified top view of a multi-aperture mask suitable for use in forming a lens array pattern in porous glass for purposes of the invention.

A pattern of particular interest is a lens array such as used for imaging in a photocopier. FIG. 1 shows in greatly exaggerated form a mask suitable for that purpose. Mask 10 is normally opaque, but a pattern of uniformly spaced circular openings 12 is provided to permit light transmission to corresponding cylindrical zones in the glass.

After photolysis, and subsequent baking to set the photolysis product, the unphotolyzed portion of the glass, that is the portion under opaque portion 14 of mask 10, is freed of organometallic material. The porous glass article is now ready for treatment in accordance with the present invention.

Initially, primary concern was directed to filling the glass pores to avoid absorption of unwanted materials in such pores. Silicone fluids were selected for study because of their known hydrophobic, and chemically and physically inert, nature. Also, their fluidity permits ease of impregnation. A variety of such polymerizable fluids is available from silicone suppliers such as Dow Corning Corporation, Midland, Mich., as are information sheets explaining the nature and reactions of such fluids.

Following heat treatment of a photolyzed, porous glass sample impregnated with a polymerizable, organo functional silicone fluid, two interesting phenomena were observed. First, it was apparent that the unexposed, and hence unphotolyzed, pores had developed meniscus effects that tended to mask the matrix areas. In contrast, the lens zones, where the photolyzed material was deposited, were essentially clear.

We do not have a scientifically certain explanation for this selective effect. However, we present the following as a plausible explanation. The lenses in the untreated blank are comprised of a metal oxide gradient which accounts for the radial index profile that is responsible for the imaging observed with such lens arrays. The metal concentration in the matrix that surrounds the lenses is significantly lower than that in the lenses. Since metals are recognized as catalysts for the polymerization of silicone fluids, resin formation proceeds at a more rapid rate in the lenses than in the matrix. Some of the unreacted fluid is exuded to the surface on heating at 80° C. Some is also volatilized. On cooling, the expanded, unreacted fluid contracts to form a myriad of menisci within the porous glass skeleton that give the matrix the opaque appearance.

The second, and potentially more important, phenomenon noted is an apparent enhancing effect that the silicone treatment has on lens power or optical strength. Thus, the lens power may be doubled in magnitude. This in turn enhances the possibility of producing one-to-one erect conjugate imaging with a lens system, or glass body, having a thickness of about 2 mm. As noted earlier, this thickness approaches the upper limit to which exposure can penetrate without creating an unacceptable axial refractive index gradient.

In carrying out our improvement invention then, a porous glass body is impregnated with an organometallic compound, selectively photolyzed to decompose the compound in the selected zones, washed or heated to remove undecomposed organometallic, impregnated with a polymerizable, organo functional silicone fluid, and then heat treated to polymerize the silicone fluid within the lens zones.

Ser. No. 277,089 fully discloses the materials and process parameters for producing optical patterns in porous glass by selective photolysis of an impregnated organometallic compound. To avoid repetition, that application is incorporated herein in its entirety and reference is made thereto. In general, the application discloses a variety of organic types that may be used. As for the metal component, this may be selected from Groups, IIIB, IVA, IVB, VB, VIB, VIIB and VIII of the Periodic Table. We have obtained optimum results for present purposes with Group IVB organometallic alkyls and alkyl halides, such as iodotrimethylstannane (ISnMe$_3$), hexamethyldistannane (Me$_6$Sn$_2$), bromotrimethylgermane (BrGeMe$_3$) and iodotrimethylsilane (ISiMe$_3$). Among other metals that may form useful organometallics, and that are recognized as having catalytic capabilities, are manganese, iron, titanium, chromium, tungsten, cobalt, vanadium, hafnium, zirconium, niobium, and tantalum.

To develop an optical pattern, a porous glass body may be completely impregnated with an organometallic compound, or solution of the same. The glass is then exposed to a source of photolytic radiation, e.g., a mercury arc lamp, through an opaque mask wherein the pattern is formed as clear, transparent areas. Thus, the organometallic, in the pores under the pattern areas of the mask, is photolyzed while adjacent areas are unchanged. The photolysis products react with or become bonded to the glass. The unphotolyzed material may be removed by washing or volatilization.

Any of the available polymerizable, organo functional silicone fluids may be employed. As explained by the material supplier, the primary purpose of an organo functional group on a siloxane is to act as a reaction site. The functional groups are described as any organoreactive site. However, those commercially available are listed as amine, carboxylic acid, secondary hydroxyl, primary hydroxyl, and mercaptan.

One advantage of this type of fluid is its ability to enter the pores without the aid of a solvent or other extraneous material. However, it has been found that the ability to improve lens power or optical strength is very dependent on a small, controlled amount of solvent. We employ an unseparated mixture of ortho-, para-, and meta-xylenes commonly referred to simply as "xylenes". Thus, the increase in lens power is substantially greater with a 90:10 silicone-xylenes mix than with a pure silicone fluid. However, the effect appears to be lost by the time the proportion of solvent is raised to 15%.

The silicone-impregnated glass body may be thermally treated to effect selective polymerization of the fluid to a resin. This may, for example be an oven bakeout below about 200° C., and preferably on the order of 100° C. Following such treatment, the fluid is found to be substantially converted to the polymerized resin state in the zones containing photolysis product. In contrast, little or no conversion is found to occur in the matrix zones, the silicone remaining fluid in these zones.

The polymerizing treatment of the silicone-impregnated glass body is preferably carried out in the presence of water vapor. The atmosphere should contain at least 20% by weight, and preferably a water vapor atmosphere. The effect of the moisture has not been determined, but it appears necessary to cause lens power enhancement by silicone polymerization.

The time required for full impregnation with silicone fluid may vary considerably, depending on specific conditions, as can the bakeout time during which polymerization occurs. In general, we prefer to impregnate for at least two (2) hours, and times up to 24 hours have been employed successfully. A bakeout of two (2) hours is usually adequate, but up to 4 or 5 hours may be employed as a safeguard. We commonly employ a second or repeat impregnation and bakeout to ensure complete filling of the pores and sealing of the body. Providing an adequate initial bake is effected, no further improvement in lens power occurs.

SPECIFIC DESCRIPTION

Glass blanks used for study were one inch square, porous glass plates about 2 mm thick. These were cut from a larger plate of Corning Code 7930 glass, a porous glass of high silica content prepared by heat treating and leaching a borosilicate glass.

Each plate was dipped into a solution of one part iodotrimethylstannane, (CH$_3$)$_3$SnI, dissolved in five (5) parts methylene chloride by volume. The solution quickly penetrated the porous glass. Thereafter the plate was removed and air dried, with or without mild heat treatment, to remove free iodine and the solvent methylene chloride.

The impregnated plate was then exposed to an ultraviolet light source for 60 minutes through a multi-aperture exposure mask comprising 0.3 mm circular apertures spaced 0.32 mm apart. Following this exposure, the glass was heat treated, preferably above 600° C. for one hour, to fix the refractive index pattern. Unreacted iodotrimethylstannane and organic constituents were thus expelled from the glass, leaving only tin oxide in the pores.

Figure 2:
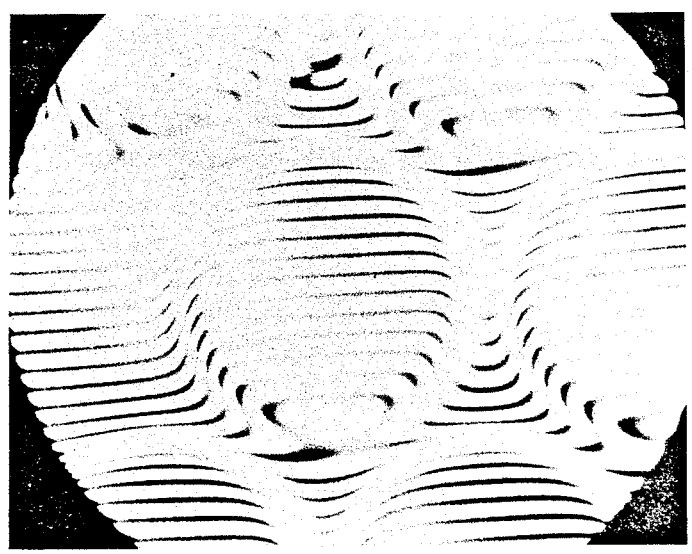
FIG. 2 is an interferogram showing a lens array pattern such as might be produced for purposes of the invention by using the mask of FIG. 1.

The product of this process is illustrated in FIG. 2 of the drawing. FIG. 2 is a photograph of the plate taken through a refractometer at an enlargement of about 100 diameters, wherein the circular high-index regions produced in the low index porous glass matrix are clearly observable. The refractive index difference resulting from the photolysis and fixing steps corresponds to about 4 fringes at 600 nm, for a refractive index difference between the high index and low index regions of about 0.0012.

A porous glass blank, thus prepared, was gradually heated to about 200° C., in an electric oven, and held for about 30 minutes to remove any adsorbed molecular water. The blank was then cooled under by conditions, and immediately immersed in a 2% by weight solution of an organo functional silicone fluid (DC 1107 fluid available from Dow-Corning Corporation) in xylenes. After 30 minutes immersion, the blank is removed, wiped dry, and baked at 100° C. for 30 minutes. This procedure was repeated to provide a silicone-pretreated porous glass blank.

The pretreated blank was then immersed in pure or 100% silicone fluid (DC 1107) and maintained immersed for one to three days at ambient temperature. With the pores of the glass completely filled with silicone fluid, the blank was wiped dry, baked in an oven at 80° C. for about an hour, and then gradually cooled to room temperature.

When the blank was cooled, it was observed that the matrix of porous glass surrounding the tin oxide-containing, gradient, refractive index lens elements had become opaque. However, the lens elements, that is the tin oxide-containing zones, remained clear and transparent.

Strips of Code 7930 (Corning Glass Works) porous glass were soaked in dilute nitric acid to thoroughly clean the pores. Thereafter, the porous glass was washed in distilled water and dried.

A group of ten samples was produced by impregnating the carefully cleaned, Code 7930 porous glass with iodotrimethylstannane as described above. The impregnated, porous glass samples were exposed to radiation longer than about 490 nanometers from a 2500 watt mercury xenon lamp. The exposure was through a multi-aperture mask having 150 micron diameter clear holes and center-to-center separation of 207 microns. Exposure time was two (2) hours. The selectively photolyzed glass samples were washed to remove unphotolyzed organmetallic, and then baked to fix the photolysis product in the pores.

Lens power measurements (D/L) on the samples were in the range of 40°–55°, whereas values in excess of 180° are required for 1:1 erect conjugate imaging.

The optically patterned samples thus produced were then immersed in a 90% solution of the silicone fluid available under the designation DC 1107. The solvent was xylenes in amount of 10% by weight. The samples remained immersed for periods of time ranging from three (3) to 24 hours. They were then removed and wiped. This was followed by baking for about four (4) hours in a water vapor atmosphere at 110° C. The immersion was then repeated, the samples dried, and baked at 110° C. for about one (1) hour in ambient atmosphere. The second impregnating treatment was undertaken to ensure complete filling of the pores with fluid, and total polymerization in the lens zones, to provide clear, stable lens arrays.

TABLE 1 below shows, in hours, the schedule followed with each sample. The first silicone impregnation is shown as "1st imp."; the second as "2nd imp.". The subsequent bakeout in each case was at 110° C.

TABLE 1

| Sample | 1st imp. | 1st bake | 2nd imp. | 2nd bake |
|---|---|---|---|---|
| 1 | 24 | 4.4 | 9.6 | 1.1 |
| 2 | 24 | 4.4 | 9.6 | 1.1 |
| 3 | 16.7 | 4.0 | 20.8 | 1.0 |
| 4 | 16.7 | 4.0 | 20.8 | 1.0 |
| 5 | 3.2 | 4.0 | 8.7 | 1.0 |
| 6 | 21.2 | 4.0 | 8.7 | 1.0 |
| 7 | 5.1 | 4.1 | 16.3 | 1.0 |

TABLE 1-continued

| Sample | 1st imp. | 1st bake | 2nd imp. | 2nd bake |
|---|---|---|---|---|
| 8 | 5.1 | 4.1 | 16.3 | 1.0 |
| 9 | 5.1 | 4.1 | 16.3 | 1.0 |
| 10 | 5.1 | 4.1 | 16.3 | 1.0 |

The lens power (D/L) in each array was calculated on the basis of measurements made (1) as initially formed by photolysis, (2) after the first silicone treatment, and (3) after the second treatment. The calculated values are shown in the TABLE below with "imp" indicating impregnation, FB indicating front surface and BF indicating back surface. Also shown is the glass thickness (D) in mm. FB means the object side corresponds to the initial exposure side; BF means object side corresponds to opposite of the exposure side. High degree of agreement between BF and FB measurements indicate little axial asymmetry.

TABLE 2

| Sample | D/L (initial) FB | BF | D/L (1st imp.) FB | BF | D/L (2nd imp.) FB | BF | Dm |
|---|---|---|---|---|---|---|---|
| 1 | 49.1° | 47.9° | 96.7° | 96.7° | 96.7° | 96.7° | 2.15 |
| 2 | 47.3° | 45.8° | 96.8° | 96.8° | 96.8° | 96.8° | 2.20 |
| 3 | 39.4° | 39.4° | 70.7° | 70.7° | 63.9° | 67.7° | 1.81 |
| 4 | 39.4° | 38.0° | 79.9° | 72.6° | 74.2° | 71.1° | 1.97 |
| 5 | 57.2° | 54.6° | 97.0° | 113.7° | 97° | 106.7° | 2.25 |
| 6 | 49.9° | 47.8° | 80.9° | 83.4° | 78.7° | 78.7° | 1.85 |
| 7 | 44.4° | 40.6° | 80.9° | 78.6° | 71.1° | 71.1° | 1.84 |
| 8 | 56.5° | 51.5° | 96.1° | 107.2° | 84.5° | 84.5° | 1.98 |
| 9 | 45.9° | 44.4° | 98.2° | 87.2° | 91.2° | 87.0° | 2.60 |
| 10 | 56.1° | 50.3° | 98.2° | 88.9° | 89.1° | 88.9° | 2.60 |

To achieve a 1:1 conjugate image with one cm. spacing in a photocopier, an accumulative D/L of 189.5° and 4° mm. glass thickness is required. This is in accordance with the equation:

$$C = \frac{-L}{n_o} \tan \frac{D}{2L}$$

where $C$ = one-to-one conjugate distance
$D$ = glass lens thickness
$n_o$ = refractive index of porous glass
$L$ = a constant derived from
$\Delta n = n_o (1 - r^2 2L^2)$ where
$r$ = lens radius It will be observed that, in this particular study, only samples exceeding 2 mm. thickness achieved a final D/L value greater than 90°. It will also be recalled that symmetric imaging, and hence similar front and back lens power, with a lens array is highly desirable. Accordingly, samples 1 and 2 were selected for stacking to provide the necessary power. The samples were visually placed in register, and then more closely aligned by maximum light transmission equipment. The composite body has the requisite lens power (D/L) of 189.5° to permit 1:1 erect conjugate imaging at one cm. distance with resolution of ten (10) line pairs/mm.

Typical lens power values were calculated from measurements made on glass samples prepared in general accordance with the foregoing description. These values are hereafter summarized to illustrate major influences for lens power enhancement. It will be appreciated that the samples measured have not been identically prepared, but are considered typical and representative.

A glass sample was prepared from a sheet of Code 7930 porous glass as received. Lens systems were created therein by selective photolysis of iodotrimethylstannane in the pores. The lens power (D/L) was determined prior to further treatment, and found to be 49.6°. The sample was then impregnated by soaking in a 100% bath of a polymerizable silicone fluid (DC-1107). The fully impregnated sample was wiped clean and baked in a water vapor atmosphere for four (4) hours at 110° C. The calculated lens power was 74.1°.

The photolysis treatment, plus silicone impregnation and bake, was carried out on a second porous glass sample in essentially the same manner, except for precleaning the glass. The porous glass was soaked in dilute nitric acid, then washed in distilled water and dried. This was intended to remove any etch products and provide an extra clean glass. The calculated lens power on this sample was 126.5°.

Silicone impregnated samples of both washed and unwashed glass samples were given corresponding treatments, except that the polymerizing bake was in an ambient atmosphere. No appreciable change in lens power was observed in either case.

Further studies indicated that optimum results are obtained with an atmosphere composed of water vapor. However, some effect is believed attainable as low as about 20% water vapor. However, considerably longer times are required and are usually not practical.

We claim:

1. An integral optical device composed of a porous glass body having an optical pattern in a zone of said body surrounded by a porous glass matrix, said optical pattern comprising a photolyzed organometallic compound in the pores of said zone, said organometallic compound being selected from the group consisting of transition metal carbonyl, metal alkyl, and metal-aryl, characterized in that said patterned zone is filled with a substantially polymerized organo functional silicone fluid, and said porous glass matrix is filled with an essentially unpolymerized organo functional silicone fluid, said silicone having functional groups selected from the group consisting of amine, carboxylic acid, primary hydroxyl, secondary hydroxyl, and mercaptan.

2. An optical device in accordance with claim 1 wherein each element in the optical pattern has a gradient refractive index.

3. An optical device in accordance with claim 2 wherein the optical pattern is an array of lens systems.

4. An optical device in accordance with claim 3 wherein the lens systems are cylindrical, have a prescribed radial gradient refractive index distribution, extend through the porous glass body to terminate in planar surfaces on opposite sides of the body, and are integrally surrounded by a porous glass matrix filled with an essentially unpolymerized, organo functional silicone fluid.

5. An optical device in accordance with claim 1 wherein the photolyzed organometallic compound is a tin compound.

6. In a method of producing an optical pattern in glass wherein,
   a. a porous glass body is impregnated with a photolyzable organometallic compound, selected from the group consisting of transition metal carbonyl, metal alkyl, and metal-aryl,
   b. the impregnated body is exposed to a source of photolyzing radiation that is patterned to selectively expose certain zones of the body and at least partially photolytically convert the organometallic compound in those zones to photolyzed intermediates that are stable in the glass, and
   c. that portion of the organometallic compound in the unexposed zones, which is not photolytically converted, is removed to leave a porous glass matrix surrounding the patterned zones, the improvement which comprises
   d. fully impregnating the optically patterned, porous glass body with a polymerizable, organo functional silicone fluid, said silicone having functional groups selected from the group consisting of amine, carboxylic acid, primary hydroxyl, secondary hydroxyl, and mercaptan, and then
   e. heating the fluid to a temperature no higher than 200° C. in at least the patterned zones to substantially polymerize the fluid in the patterned zones and to leave the fluid in the porous glass matrix essentially unpolymerized.

7. The method of claim 6 wherein the organometallic compound is removed from unexposed zones by volatilization.

8. The method of claim 6 wherein the organometallic compound is removed by washing.

9. The method of claim 6 wherein the glass body impregnated with the organometallic compound is exposed to photolyzing radiation through a multiaperture mask to produce a pattern of lens-like elements.

10. The method of claim 6 wherein the photolyzable organometallic compound is a tin compound.

11. The method of claim 6 wherein the porous glass body is impregnated with a solution of a polymerizable, organo functional silicone fluid, the solution containing not over about 15% solvent.

12. The method of claim 11 wherein the solvent is a xylene mixture.

13. The method of claim 11 wherein the silicone fluid:solvent ratio is about 9:1.

14. A method of substantially increasing the optical power of a patterned element surrounded by a porous glass matrix, said patterned element being created in a porous glass body by selective photolysis of an organometallic compound in the glass pores, said organometallic compound being selected from the group consisting of transition metal carbonyl, metal alkyl, and metal-aryl, which comprises impregnating the optically-patterned, porous glass body with a polymerizable, organo silicone fluid, said silicone having functional groups selected from the group consisting of amine, carboxylic acid, primary hydroxyl, secondary hydroxyl, and mercaptan, and then heating the fluid to a temperature no higher than 200° C. in at least the patterned zone to substantially polymerize the fluid in the patterned zone while the fluid in the matrix glass remains essentially unpolymerized.

15. The method of claim 14 wherein the patterned element is a lens system having a radial gradient refractive index distribution.

16. The method of claim 14 wherein the porous glass body is impregnated with a solution of a polymerizable, organo functional silicone fluid, the solution containing not over about 15% solvent.

17. The method of claim 14 wherein the silicone fluid in the patterned zone is polymerized by a thermal treatment.

18. The method of claim 14 wherein the polymerizing step is carried out in an atmosphere containing at least 20% water vapor.

19. The method of claim 18 wherein the atmosphere is composed of water vapor.

* * * * *